United States Patent
Fang et al.

(10) Patent No.: US 10,516,288 B2
(45) Date of Patent: Dec. 24, 2019

(54) WIRELESS CHARGING SYSTEM AND METHOD

(71) Applicants: NEWVASTEK CO., LTD., New Taipei (TW); GUNITECH CORP., New Taipei (TW)

(72) Inventors: Ming-Liang Fang, New Taipei (TW); Chih-Hao Chuang, New Taipei (TW); Huan-Ruei Shiu, New Taipei (TW)

(73) Assignees: NEWVASTEK CO., LTD., New Taipei (TW); GUNITECH CORP., New Taipei (TW)

( * ) Notice: Subject to any disclaimer, the term of this patent is extended or adjusted under 35 U.S.C. 154(b) by 62 days.

(21) Appl. No.: 15/854,759

(22) Filed: Dec. 27, 2017

(65) Prior Publication Data

US 2019/0199116 A1    Jun. 27, 2019

(51) Int. Cl.
*H02J 7/02* (2016.01)
*H02J 7/00* (2006.01)
*H04B 5/00* (2006.01)
*H04B 17/318* (2015.01)
*H04W 4/80* (2018.01)

(52) U.S. Cl.
CPC ....... *H02J 7/025* (2013.01); *H02J 2007/0096* (2013.01); *H04B 5/0037* (2013.01); *H04B 17/318* (2015.01); *H04W 4/80* (2018.02)

(58) Field of Classification Search
CPC ... H02J 7/025; H02J 2007/0096; H04W 4/80; H04B 17/318; H04B 5/0037
USPC ........................................................ 320/108
See application file for complete search history.

(56) References Cited

U.S. PATENT DOCUMENTS

| | | | |
|---|---|---|---|
| 9,622,105 B2* | 4/2017 | Wang | H04W 76/10 |
| 9,854,617 B1* | 12/2017 | Fang | H02J 50/00 |
| 9,906,063 B2* | 2/2018 | Lee | H02J 17/00 |
| 9,966,789 B2* | 5/2018 | Fang | H02J 7/025 |
| 2015/0052221 A1* | 2/2015 | Yoon | H04W 8/00 709/217 |
| 2018/0091930 A1* | 3/2018 | Jefferies | H04L 67/125 |
| 2018/0102668 A1* | 4/2018 | Hong | H02J 7/025 |
| 2018/0205257 A1* | 7/2018 | Kwon | H05K 7/20 |

* cited by examiner

*Primary Examiner* — M Baye Diao
(74) *Attorney, Agent, or Firm* — Leong C. Lei

(57) ABSTRACT

Each wireless charging device of the wireless charging system has a Bluetooth module for detecting signal strength between the wireless charging device and an electronic device. The signal strength information is shared among the wireless charging devices by their data transceiver units. An analysis module of each wireless charging device automatically determines one wireless charging device having the best connection, and a decision module of the determined wireless charging device transmits a charging permit to the electronic device. Cross connection of the electronic device to multiple wireless charging devices is therefore avoided.

5 Claims, 7 Drawing Sheets

WIRELESS CHARGING SYSTEM AND METHOD

BACKGROUND OF THE INVENTION (a) Technical Field of the Invention

The present invention generally relates to wireless charging, and more particularly to a wireless charging system and a related method capable of enhancing connection quality and reliability, and avoiding erroneous connection.

(b) Description of the Prior Art

As wireless charging gains popularity, a possible scenario is that a mobile device may be located within overlapped coverages of multiple wireless charging devices. When the mobile device is lined with one of the wireless charging device, the mobile device may continuously receive authorization messages from other wireless charging devices. Or the mobile device may constantly switch connection to a number of wireless charging devices if there is no significant distinction among them.

In other words, existing wireless charging solutions have a number of drawbacks: (1) there are waste of power and extraneous electromagnetic waves due to blind detection and connection; (2) usually a server is required to coordinate the wireless charging devices.

SUMMARY OF THE INVENTION

A major objective of the present invention is to provide a system of wireless charging devices capable of mutual communications, automatically determining and selecting one connecting with an electronic device, and sharing this selection information with all wireless charging devices so as to enhance connection reliability and to prevent cross connection.

To achieve the objective, the wireless charging system includes a number of wireless charging devices. Each wireless charging device includes a Bluetooth module for wirelessly linking at least an electronic device, a signal detection module for detecting a signal strength between the Bluetooth module and the electronic device, a data transceiver unit electrically connected to the signal detection module for transmitting at least a broadcast message to all other wireless charging devices, an analysis module electrically connected to the data transceiver unit for determining one of the wireless charging devices as a selected wireless charging device as having a best connection with the electronic device based on the signal strength and the broadcast messages received, and a decision module electrically connected to the analysis module for transmitting a charging permit to the electronic device if the decision module is inside the selected wireless charging device. Therefore, the wireless charging system shares the connection strengths of an electronic device to the wireless charging devices through the signal detection modules and the data transceiver units, automatically determines a wireless charging device having the best connection by the analysis modules, issues a charging permit to the electronic device by the decision module of the selected wireless charging device so as to conduct the wireless charging to the electronic device. In the meantime, the other wireless charging devices are prevented from continuously detecting the electronic device, thereby enhancing the wireless charging reliability and preventing erroneous connection.

The present invention therefore resolves the shortcomings of the prior art such as redundant detections by the wireless charging devices, energy waste, unreliable wireless charging, or an additional server is required to coordinate the wireless charging devices.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
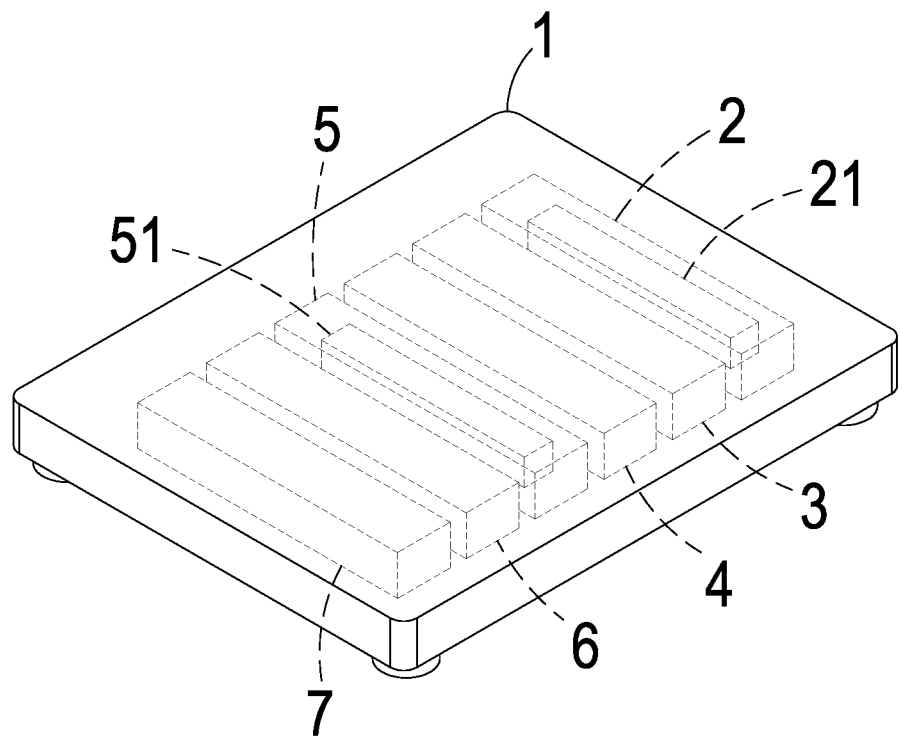
FIG. 1 is a schematic perspective diagram showing a wireless charging device of the wireless charging system according to an embodiment of the present invention.
Figure 2:
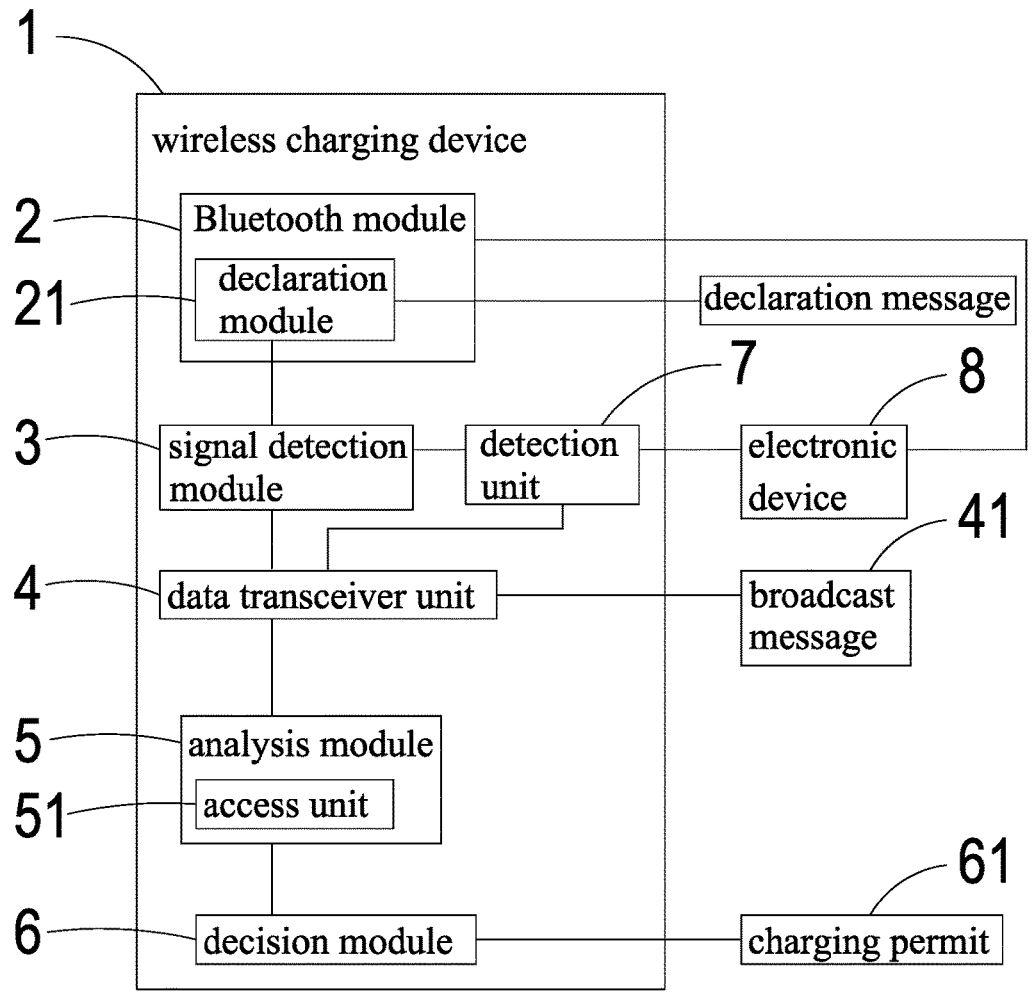
FIG. 2 is a functional block diagram showing the wireless charging device of the wireless charging system of FIG. 1.
Figure 3:
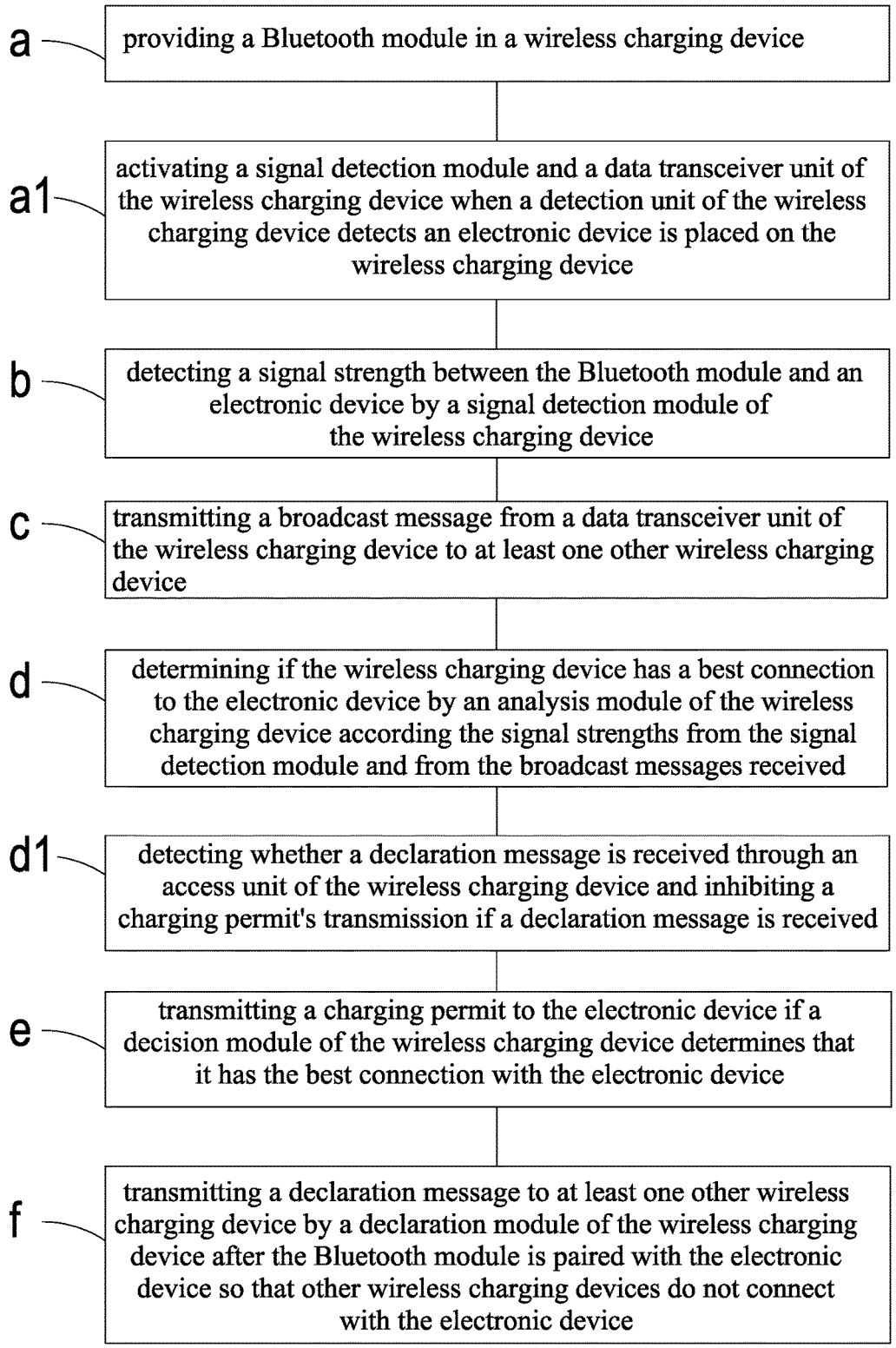
FIG. 3 is a flow diagram showing the steps of a wireless charging method according to an embodiment of the present invention.
Figure 4:
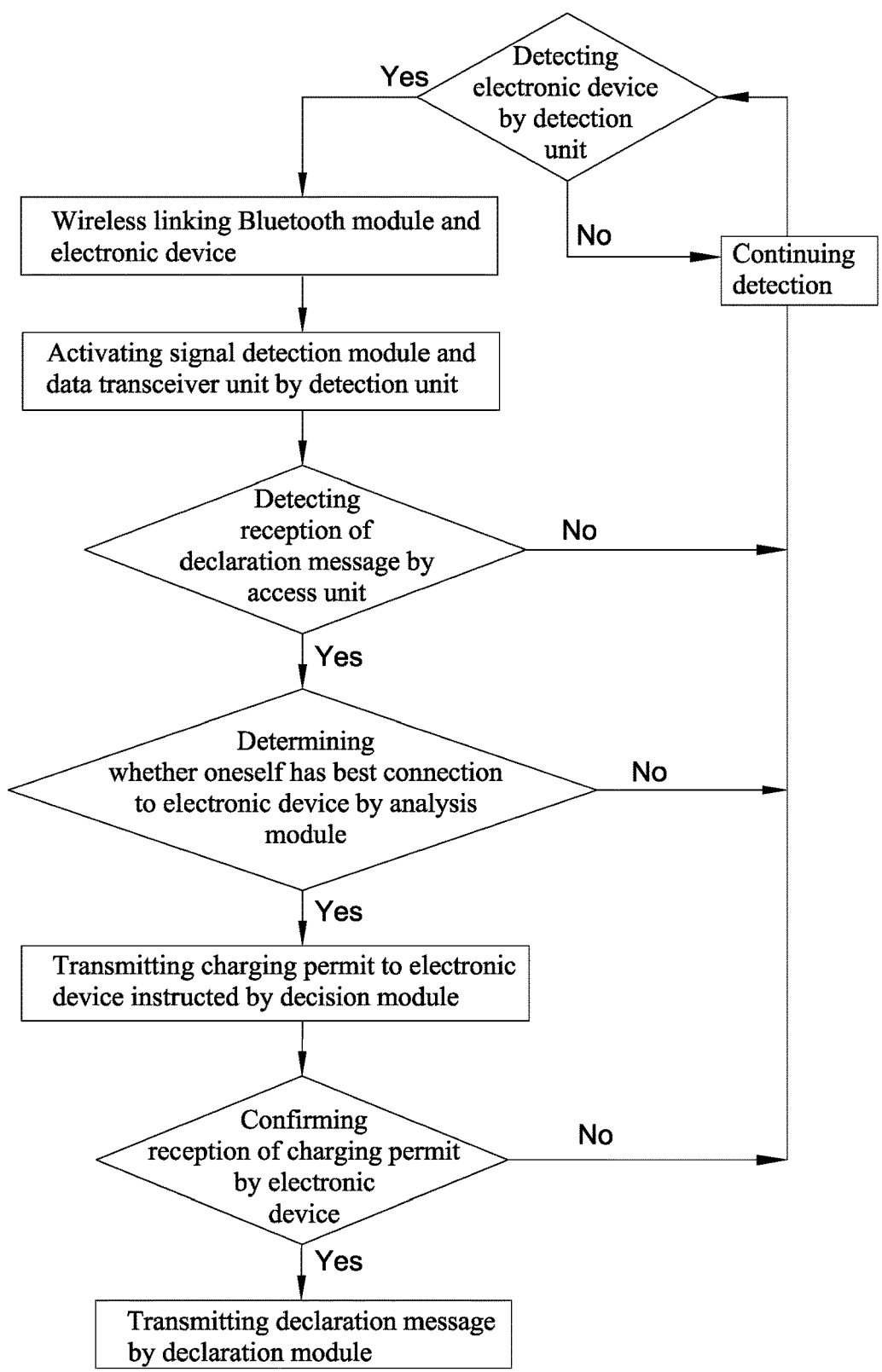
FIG. 4 is a flow diagram showing how a wireless charging device is connected to an electronic device.
Figure 5:
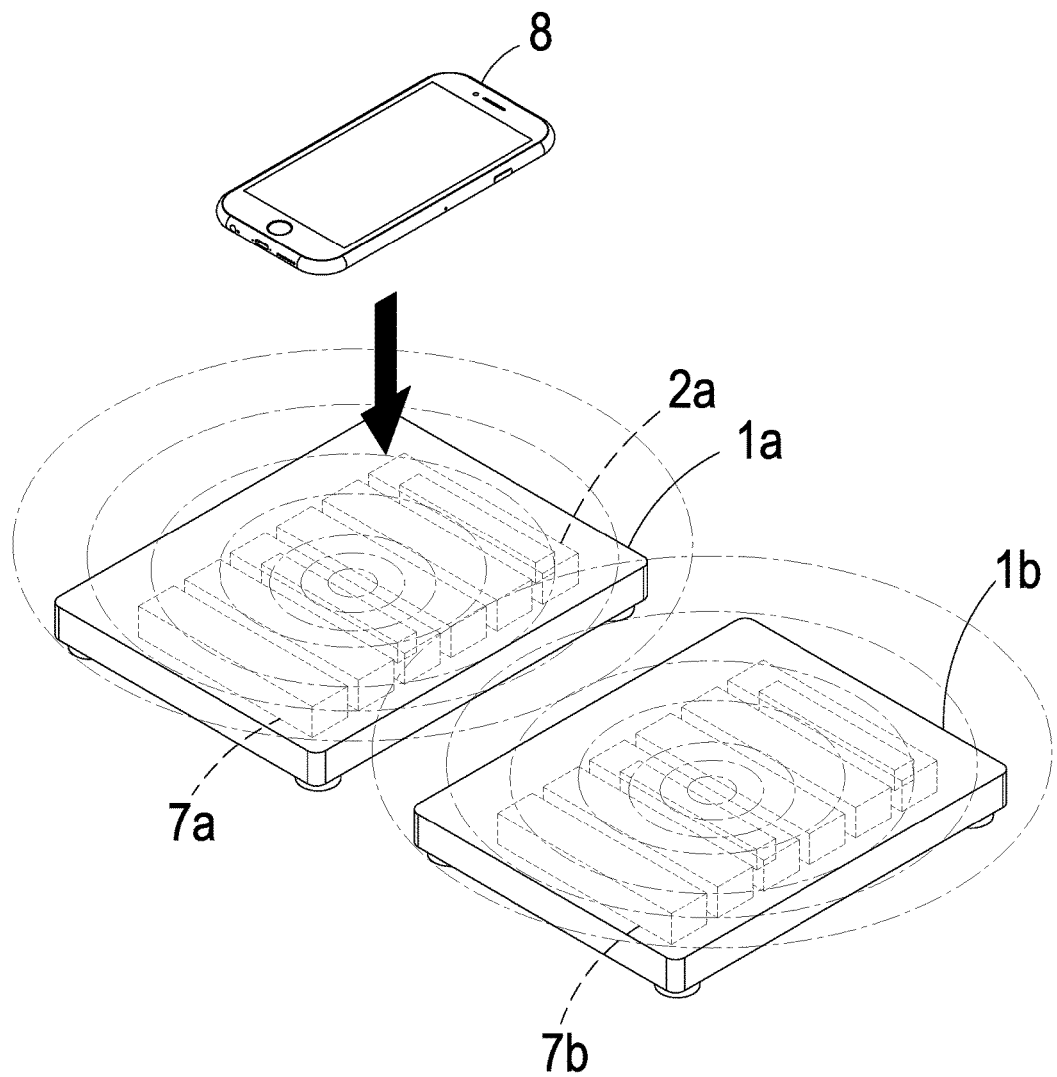
FIG. 5 is schematic perspective diagram showing a scenario involving two wireless charging devices.
Figure 6:
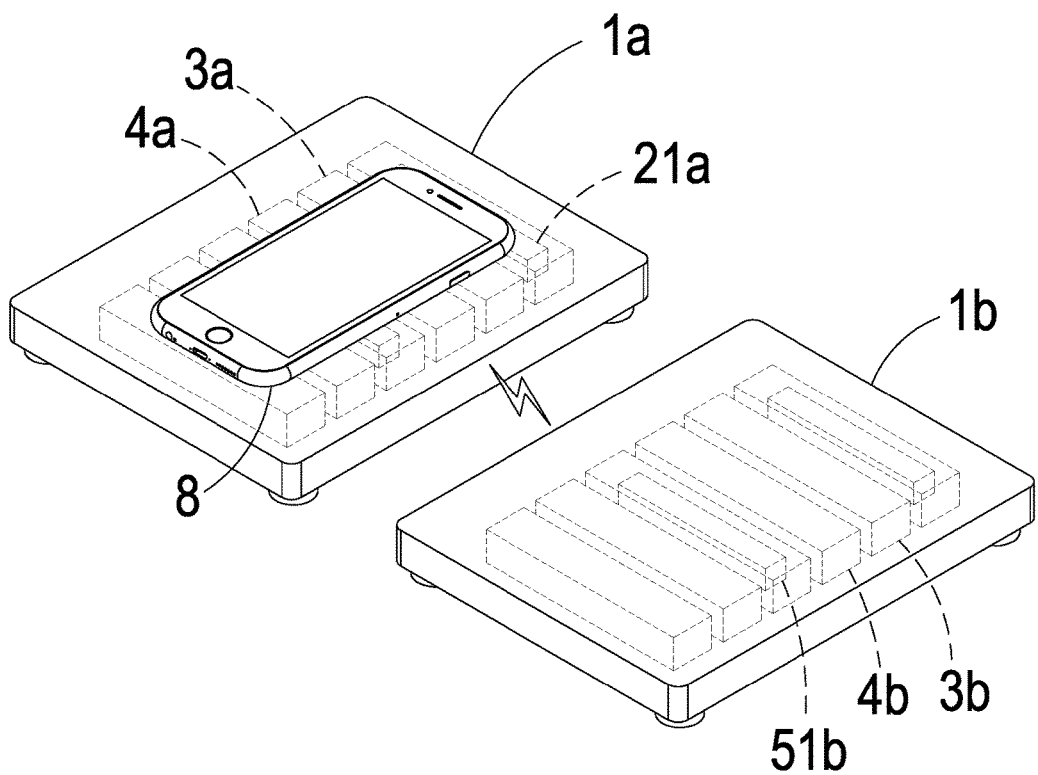
FIG. 6 is schematic perspective diagram showing a scenario involving two wireless charging devices and an electronic device being placed on one of the wireless charging devices.
Figure 7:
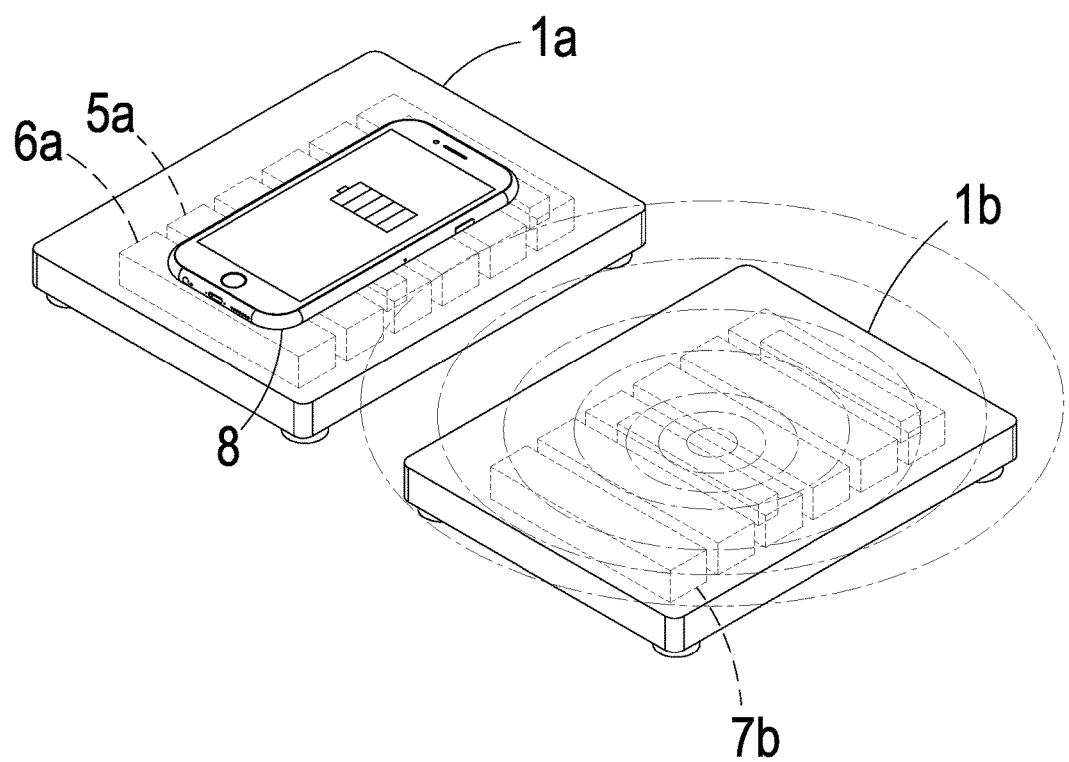
FIG. 7 is schematic perspective diagram showing a scenario involving two wireless charging devices and an electronic device being placed on one of the wireless charging devices.

As shown in FIGS. 1 to 3, a wireless charging system according to an embodiment of the present invention include the following components.

There are a number of wireless charging devices 1.

Each wireless charging device 1 includes a Bluetooth module 2 wirelessly linked with at least an electronic device 8. Each Bluetooth module 2 includes a declaration module 21 which transmits a declaration message to at least one other wireless charging device 1 after the Bluetooth module 2 is paired with the electronic device 8 to prevent the other wireless charging device 1 from connecting the electronic device 8. The electronic device 8 may be a smart phone, a notebook computer, a tablet computer, or a desktop computer.

Each wireless charging device 1 also includes a signal detection module 3 for detecting a signal strength between the Bluetooth module 2 and the linked electronic device 8.

Each wireless charging device 1 also includes a data transceiver unit 4 electrically connected to the signal detection module 3. The data transceiver units 4 of the wireless charging devices 1 transmit broadcast messages 41 to each other.

Each wireless charging device 1 also includes a detection unit 7 that, after detecting an electronic device 8 being placed on the wireless charging device 1, activates the signal detection module 3 and the data transceiver unit 4.

Each wireless charging device 1 also includes an analysis module 5 electrically connected to the data transceiver unit 4. The analysis module 5 determines which wireless charging device 1 has a best connection with the electronic device 8, based on the signal strength from the signal detection module 3 and the signal strengths of other wireless charging devices 1 from the received broadcast messages 41. The analysis module 5 includes an access unit 51 that, upon receiving a declaration message, inhibits the transmission of a charging permit 61.

Each wireless charging device 1 also includes a decision module 6 electrically connected to the analysis module 5. The decision module 6, based on a result of the analysis module 5, transmits the charging permit 61 to the electronic device 8 if the present wireless charging device 1 has the best connection.

A wireless charging method according to an embodiment of the present invention includes the following steps.

Step (a) provides a Bluetooth module in a wireless charging device.

Step (a1) activates a signal detection module and a data transceiver unit in the wireless charging device when a detection unit in the wireless charging device detects an electronic device is placed on the wireless charging device.

Step (b) detects a signal strength between the Bluetooth module and an electronic device by a signal detection module of the wireless charging device.

Step (c) transmits a broadcast message from a data transceiver unit of the wireless charging device to at least one other wireless charging device.

Step (d) determines a best connection between the electronic device and all wireless charging device by an analysis module according the signal strengths from the signal detection module and from the broadcast messages received.

Step (d1) detects whether a declaration message is received through an access unit of the wireless charging device and inhibits a charging permit's transmission if a declaration message is received.

Step (e) transmits a charging permit to the electronic device if a decision module of the wireless charging device determines that it has the best connection with the electronic device.

Step (f) transmits a declaration message to at least one other wireless charging device by a declaration module of the wireless charging device after the Bluetooth module is paired with the electronic device so that other wireless charging devices do not connect with the electronic device.

As shown in FIGS. 1 to 7, the present invention integrates functional electronic circuit components (i.e., the Bluetooth module 2, the signal detection module 3, the data transceiver unit 4, the analysis module 5, and the decision module 6) such as RF detector, antenna, ICs in the wireless charging device 1. The wireless charging devices 1 communicate with each other through the broadcast messages 41. Before the electronic device 8 is wirelessly charged, a wireless charging device 1 having the best connection with the electronic device 8 is determined. The decision module 6 of the determined wireless charging device 1 transmits a charging permit 61 to the electronic device 8 (e.g., a cellular phone).

Using two wireless charging devices 1a and 1b as example, when the detection unit 7a detects that an electronic device 8 is placed on the wireless charging device 1a, the signal detection module 3a and the data transceiver 4a is activated. In the meantime, the detection unit 7b of the wireless charging device 7b continues its detection as no electronic device 8 is detected. The Bluetooth module 2a then wirelessly links with the electronic device 8, and the data transceiver unit 4a transmits a broadcast message 41 to the other wireless charging device 7b. The broadcast message 41 contains information about the electronic device 8 and its charging. The broadcast message also include the signal strength detected by the signal detection module 3a. The analysis module 5a, based on the information contained in the broadcast messages, determines that the wireless charging device 1a has the best connection to the electronic device 8. The decision module 6a therefore triggers the wireless charging device 1a to transmit a charging permit 61 to the electronic device 8. In the meantime, In the meantime, the detection unit 7b of the wireless charging device 7b continues to detect electronic device 8.

When the Bluetooth module 2a is paired with the electronic device 8 and wireless charging is conducted, a declaration message is transmitted by the declaration module 21a to the other wireless charging device 1b so as prevent the wireless charging device 1b to connect with the electronic device 8. As such, the wireless charging device 1b may reduce its power consumption and cross connection between the wireless charging devices 1a and 1b by the electronic device 8 may be avoided as well.

If the other wireless charging device 1b receives the declaration message through the access unit 51b earlier, the wireless charging device 1b may omit the activation of the signal detection module 3b and the data transceiver unit 4b, and only the detection unit 7b will function to detect the electronic device 8.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A wireless charging system, comprising a plurality of wireless charging devices, wherein each wireless charging device comprises
- a Bluetooth module for wirelessly linking at least an electronic device;
- a signal detection module for detecting a signal strength between the Bluetooth module and the electronic device;
- a data transceiver unit electrically connected to the signal detection module for transmitting at least a broadcast message to all other wireless charging devices;
- an analysis module electrically connected to the data transceiver unit for determining one of the wireless charging devices as a selected wireless charging device as having a best connection with the electronic device based on the signal strength and the broadcast messages received; and a decision module electrically connected to the analysis module for transmitting a charging permit to the electronic device if the decision module is inside the selected wireless charging device.

2. The wireless charging system according to claim 1, wherein each wireless charging device further comprises a detection unit that, if an electronic device is placed on a wireless charging device having the detection unit, activates the signal detection module and the data transceiver unit of the wireless charging device.

3. The wireless charging system according to claim 1, wherein each Bluetooth module comprises a declaration module for transmitting a declaration message to at least one other wireless charging device after the Bluetooth module is paired with the electronic device to prevent the other wireless charging device from connecting to the electronic device.

4. The wireless charging system according to claim 3, wherein the analysis module comprises an access unit that, upon receiving a declaration message, inhibits the transmission of the charging permit.

5. The wireless charging system according to claim 1, wherein the electronic device is one of a smart phone, a notebook computer, a tablet computer, and a desktop computer.

\* \* \* \* \*